(12) United States Patent
Chiu

(10) Patent No.: US 11,541,567 B2
(45) Date of Patent: Jan. 3, 2023

(54) MACHINE TOOL

(71) Applicant: Chih-Hui Chiu, Yilan County (TW)

(72) Inventor: Chih-Hui Chiu, Yilan County (TW)

( * ) Notice: Subject to any disclaimer, the term of this patent is extended or adjusted under 35 U.S.C. 154(b) by 160 days.

(21) Appl. No.: 16/997,999

(22) Filed: Aug. 20, 2020

(65) Prior Publication Data

US 2021/0053247 A1 Feb. 25, 2021

(30) Foreign Application Priority Data

Aug. 22, 2019 (TW) ................................ 108130095

(51) Int. Cl.
*B27B 5/38* (2006.01)
*B27G 19/02* (2006.01)
*F16P 3/14* (2006.01)
*H01Q 1/36* (2006.01)

(52) U.S. Cl.
CPC ................ *B27B 5/38* (2013.01); *B27G 19/02* (2013.01); *F16P 3/147* (2013.01); *H01Q 1/36* (2013.01)

(58) Field of Classification Search
CPC .. B27B 5/38; B27G 19/02; H01Q 1/36; F16P 3/12; F16P 3/144; F16P 3/145; F16P 3/147; F16P 3/148
USPC ................................................ 83/DIG. 1, 58
See application file for complete search history.

(56) References Cited

U.S. PATENT DOCUMENTS

| | | | | |
|---|---|---|---|---|
| 3,785,230 | A * | 1/1974 | Lokey | F16P 3/148 30/388 |
| 5,081,406 | A * | 1/1992 | Hughes | B23D 59/005 318/478 |
| 6,922,153 | B2 | 7/2005 | Pierga et al. | |
| 7,421,932 | B1 * | 9/2008 | Heinzmann | B23Q 17/2438 83/477.2 |
| 10,322,522 | B2 * | 6/2019 | DeCicco | B23D 45/067 |
| 10,663,113 | B2 * | 5/2020 | Dolivo | F16P 3/147 |
| 2004/0123709 | A1 * | 7/2004 | Metzger, Jr. | B23D 59/001 83/76.1 |
| 2005/0145080 | A1 * | 7/2005 | Voigtlaender | B23D 59/005 307/328 |

(Continued)

FOREIGN PATENT DOCUMENTS

TW 201313426 A1 4/2013
TW 201811487 A 4/2018

OTHER PUBLICATIONS

TW1626113B English Translation; Chiu Chih-Hui; Sep. 12, 2016.*

*Primary Examiner* — Laura M Lee
(74) *Attorney, Agent, or Firm* — Li & Cai Intellectual Property (USA) Office

(57) ABSTRACT

A machine tool includes a tool and a protective device. The tool includes a saw blade and a motor for driving the saw blade. An insulating member is arranged between the saw blade and the motor. The protective device includes a signal receiving unit, a control unit and a breaker. The signal receiving unit has an antenna receiving end that is in electrical contact with a middle region of the saw blade. The breaker is electrically connected between the motor and a utility power supply. The control unit is connected to the signal receiving unit and the breaker. The saw blade is used as an antenna by the signal receiving unit to receive an electromagnetic wave having the same frequency as that of a utility power from an environment, and the control unit controls the breaker according to a change of intensity in the electromagnetic wave.

8 Claims, 10 Drawing Sheets

(56) References Cited

U.S. PATENT DOCUMENTS

| | | | | |
|---|---|---|---|---|
| 2010/0152882 A1* | 6/2010 | Krapf | ................ | B23Q 11/0082 |
| | | | | 700/177 |
| 2014/0130645 A1* | 5/2014 | Takano | .................. | F16P 3/147 |
| | | | | 83/13 |
| 2015/0314409 A1* | 11/2015 | Chiu | ...................... | B23D 47/12 |
| | | | | 83/62.1 |
| 2019/0120427 A1* | 4/2019 | Dolivo | ................ | H02H 1/0007 |
| 2019/0262958 A1* | 8/2019 | Chiu | ................... | B23D 47/123 |
| 2021/0053247 A1* | 2/2021 | Chiu | ...................... | B27G 19/02 |

\* cited by examiner

MACHINE TOOL

CROSS-REFERENCE TO RELATED PATENT APPLICATION

This application claims the benefit of priority to Taiwan Patent Application No. 108130095, filed on Aug. 22, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a machine tool, and in particular to a machine tool that effectively prevents a user from coming in contact with a saw blade during operation thereof and prevents wires from getting tangled or being severed by the saw blade.

BACKGROUND OF THE DISCLOSURE

Of cutting and processing machines, a machine tool is one which causes users to get cut and hurt most easily during operation, especially when the machine tool is for cutting wood. The users get hurt easily from operating the machine tool, whether they are professional technicians or people who are used to a do-it-yourself scenario. Usually, in order to increase the safety of using the machine tool, a conventional machine tool is mostly provided with a safety device.

With regard to the safety device of the machine tool, the most common method is to have a transparent safety cover additionally installed at an outer periphery of the machine tool, so as to keep the user from being too close to a saw blade of the machine tool. Alternatively, a security sensor is placed at the periphery of the machine tool so that the machine tool stops working when the user gets too close to the saw blade of the machine tool. However, given that the security sensor has many blind spots in detection, a safety problem for the user may easily occur due to detection failure. Therefore, the method of placing the security sensor at the periphery of the machine tool can still easily cause safety issues.

SUMMARY OF THE DISCLOSURE

In response to the above-referenced technical inadequacies, the present disclosure provides a machine tool.

In one aspect, the present disclosure provides a machine tool including a tool and a protective device. The tool includes a saw blade and a driving element, with the saw blade being driven by the driving element. The protective device includes a signal receiving unit and a control unit, and the signal receiving unit is in electrical contact with the saw blade. The control unit is connected to the signal receiving unit. The saw blade is used as an antenna by the signal receiving unit to receive an electromagnetic wave from an environment, and the control unit controls the driving element according to a parameter of the electromagnetic wave. When the control unit determines that the parameter of the electromagnetic wave is higher than a threshold value, the control unit controls the driving element to stop driving the saw blade.

In certain embodiments, the signal receiving unit includes a wireless transmitting unit, and the wireless transmitting unit is configured to wirelessly transmit the parameter of the electromagnetic wave to the control unit.

In certain embodiments, the control unit calculates a power intensity of the electromagnetic wave according to a voltage of the electromagnetic wave, and the parameter includes one or both of the voltage and the power intensity.

In certain embodiments, a correction area is defined proximate to the saw blade on a countertop surface of a machine table of the machine tool. When a finger of a user is placed in the correction area, and the saw blade and the finger of the user form an equivalent antenna, the machine tool enters a correction mode. In the correction mode, the signal receiving unit receives the electromagnetic wave by the equivalent antenna, and the control unit sets the threshold value according to the parameter of the electromagnetic wave.

In certain embodiments, the protective device further includes an electrically conductive member, which is in electrical contact with a first side surface of the saw blade and is electrically connected with a receiving end of the antenna. The driving element is disposed on a second side surface of the saw blade, and the first side surface is an opposite side of the second side surface.

In another aspect, the present disclosure provides a machine tool including a tool and a protective device. The tool includes a saw blade and a motor, with the saw blade being driven by the motor. An insulating member is arranged between the saw blade and the motor. The protective device includes a signal receiving unit, a control unit, and a breaker. The signal receiving unit has an antenna receiving end, and the antenna receiving end is in electrical contact with a middle region of the saw blade. The breaker is electrically connected between the motor and a utility power supply, and the control unit is connected to the signal receiving unit and the breaker. The saw blade is used as an antenna by the signal receiving unit to receive an electromagnetic wave having the same frequency as that of a utility power from an environment, and the control unit controls the breaker according to a change of intensity in the electromagnetic wave. When the control unit determines that a power intensity of the electromagnetic wave is higher than a threshold value, the control unit controls the breaker to stop electricity from being provided to the motor.

In certain embodiments, the signal receiving unit includes a wireless transmitting unit, and the wireless transmitting unit is configured to wirelessly transmit data information of the electromagnetic wave to the control unit.

In certain embodiments, the control unit calculates the power intensity of the electromagnetic wave according to a voltage amplitude of the electromagnetic wave. The parameter includes one or both of the voltage amplitude and the power intensity.

In certain embodiments, a correction area is provided on the machine tool for placing a finger of a user, and the correction area is proximate to the saw blade. When the finger of the user is placed in the correction area, the saw blade and the finger of the user form an equivalent antenna, and the protective device enters a correction mode. In the correction mode, the signal receiving unit receives the electromagnetic wave by the equivalent antenna, and the control unit sets the threshold value according to the power intensity of the electromagnetic wave received in the correction mode.

In certain embodiments, the protective device further includes an electrically conductive member. The electrically conductive member includes a mercury connector, and the mercury connector is in electrical contact with a first side surface of the saw blade and is electrically connected with the antenna receiving end. The driving element is disposed on a second side surface of the saw blade, and the first side surface is an opposite side of the second side surface.

Therefore, in the machine tool of the present disclosure, by virtue of "the saw blade being used as an antenna by the signal receiving unit to receive the electromagnetic wave having the same frequency as that of the utility power from the environment," and "the signal receiving unit being capable of transmitting wirelessly to the control unit to replace a wired connection method of having a common signal receiver connected to the saw blade by wires," the wires would not get tangled with the saw blade that is actuated, the electrically conductive member, etc., such that an actuation of the saw blade is not affected by the wires, and the wires may be prevented from being severed by the saw blade. At the same time, when the user is not at a safe distance from the saw blade and before the user comes in contact with the saw blade that is actuated, the actuation of the saw blade is stopped instantaneously so that the user can be effectively prevented from being in contact with the saw blade and getting hurt.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
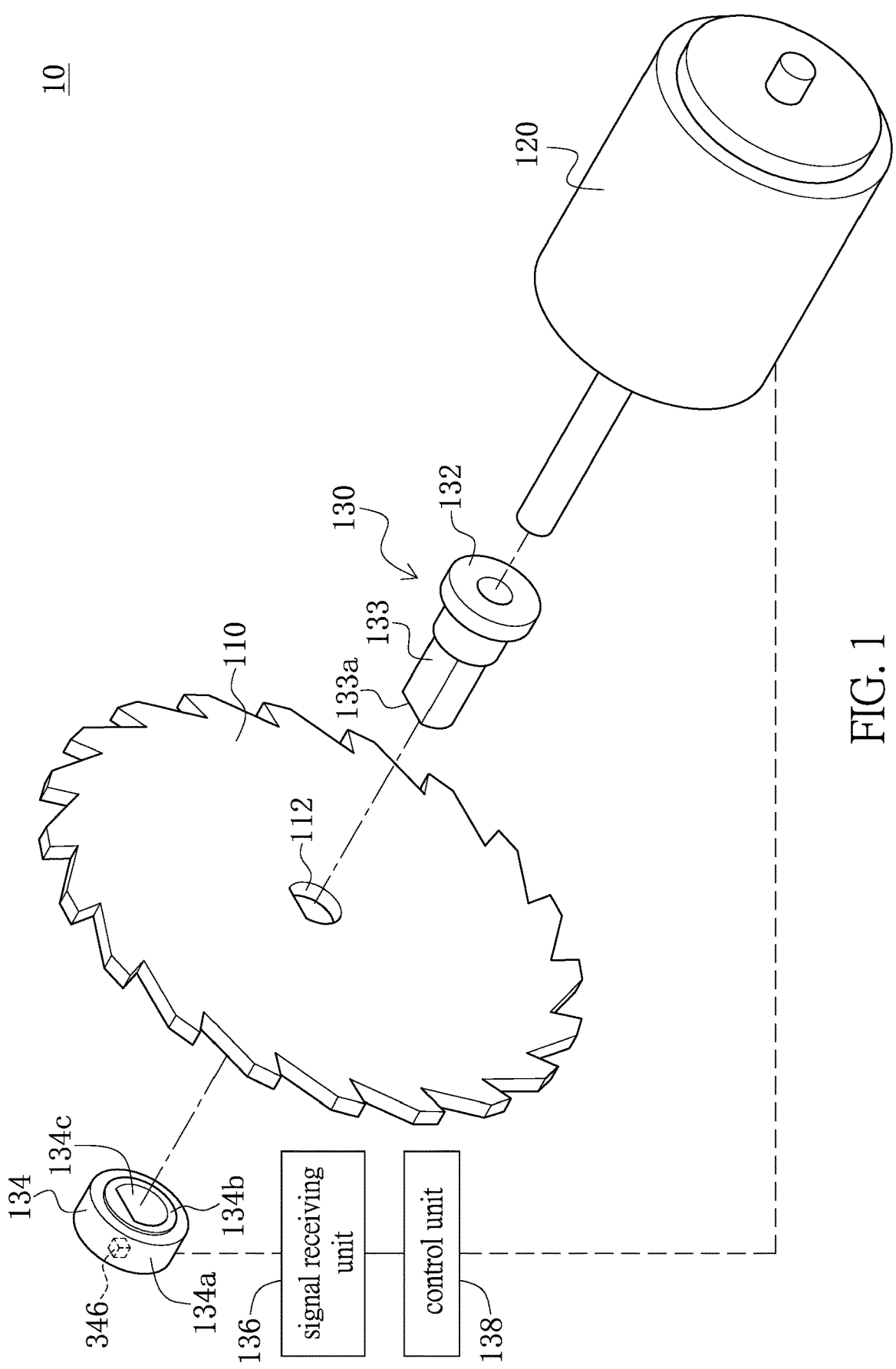
FIG. 1 is an exploded view of a machine tool according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
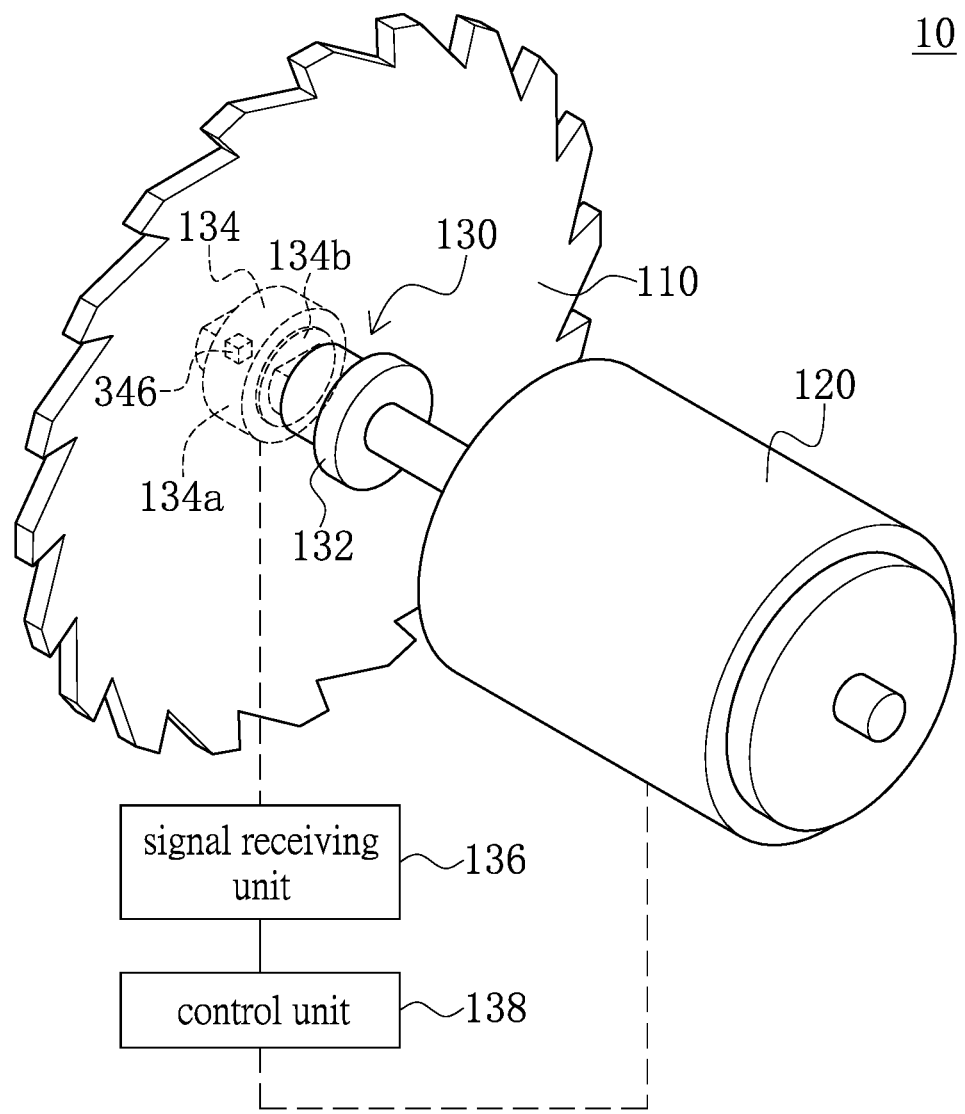
FIG. 2 is a structural view of the machine tool according to the first embodiment of the present disclosure.

References are made to FIG. 1 and FIG. 2, in which FIG. 1 illustrates an exploded view of a machine tool according to a first embodiment of the present disclosure, and FIG. 2 illustrates a structural view of the machine tool according to the embodiment of the present disclosure.

A machine tool 10 of the present embodiment includes a tool and a protective device. As shown in FIG. 1 and FIG. 2, the tool includes a saw blade 110 and a driving element 120. In practice, the saw blade 110 can be replaced with a grinding wheel sheet, a drill bit or an actuator of any other type. The driving element 120 can be a motor or any other driving element that can drive the saw blade 110 to be actuated, or an actuator of any other type. The above are examples for illustrative purposes only, and the present disclosure is not limited thereto. The protective device includes a signal receiving unit 136 and a control unit 138. The control unit 138 can be a controller that is connected to the signal receiving unit 136.

The protective device can further include an electrically conductive member 134 that is arranged between the saw blade 110 and the signal receiving unit 136, and configured to electrically connect the saw blade 110 and the signal receiving unit 136. Specifically, the electrically conductive member 134 has a holding part 134*a* and a linkage part 134*b* which is located inside the holding part 134*a*. The linkage part 134*b* of the electrically conductive member 134 is in direct electrical contact with a first side surface of the saw blade 110, for example, a middle region on the first side surface of the saw blade 110. The middle region covers a peripheral area of a through hole 112 of the saw blade 110. The holding part 134*a* of the electrically conductive member 134 is electrically connected with the signal receiving unit 136. The driving element 120 is disposed on a second side surface of the saw blade 110, and the first side surface is an opposite side of the second side surface.

An insulating member 130 can be arranged between the saw blade 110 and the driving element 120, so as to insulate the electrically conductive member 134 from the driving element 120. Specifically, the insulating member 130 has a recessed part 133, and the recessed part 133 has an alignment end 133*a*. The electrically conductive member 134 has a through hole 134*c* that corresponds in shape to the recessed part 133 of the insulating member 130. Likewise, the saw blade has a through hole 112 that corresponds in shape to the recessed part 133.

Furthermore, the insulating member 130 has a recessed part 132. A counter shaft of the driving element 120 can pass into the recessed part 132 of the insulating member 130. The recessed part 133 of the insulating member 130 can pass into the through hole 134*c* of the electrically conductive member 134 and the through hole 112 of the saw blade 110, and be aligned with the alignment end 133*a* of the recessed part 133. That is to say, the electrically conductive member 134 can be a bearing, and the linkage part 134*b* of the electrically conductive member 134 is set on the recessed part 133 of the insulating member 130. Under this configuration, the linkage part 134*b* of the electrically conductive member 134 and the saw blade 110 are fixed in position on the recessed part 133 of the insulating member 130, and the saw blade 110 is in electrical contact with the linkage part 134*b* of the electrically conductive member 134 and does not easily fall from the insulating member 130.

The holding part 134*a* of the electrically conductive member 134 can be a mercury connector. The linkage part 134*b* of the electrically conductive member 134 is positioned at the holding part 134*a*, but the linkage part 134*b* is not fixed in position at the holding part 134*a*. Therefore, the linkage part 134*b* is rotatable relative to the holding part 134*a*. When the driving element 120 drives the insulating member 130, the linkage part 134*b* of the electrically conductive member 134 and the saw blade 110 are driven by the insulating member 130. At this time, the holding part 134*a* of the electrically conductive member 134 would not be actuated along with the insulating member 130, the linkage part 134*b* and the saw blade 110. Therefore, a connecting wire between the signal receiving unit 136 and the holding part 134*a* of the electrically conductive member 134 can be prevented from getting tangled with other components, such as the saw blade 110 and the electrically conductive member 134, by a rotation of the driving element 120, and affecting actuation of the other components to the extent that the connecting wire is severed by the saw blade 110.

It should be noted that when the saw blade 110 is used as an antenna to receive an electromagnetic wave from an environment surrounding the saw blade 110, the signal receiving unit 136 can receive the electromagnetic wave from the saw blade 110. The signal receiving unit 136 includes a wireless transmitting unit, is disposed adjacent to an emitter 346 on the holding part 134*a* of the electrically conductive member 134, and is configured to receive a radio frequency electromagnetic wave from the emitter 346 through a magnetic field induction and transmit the electromagnetic wave wirelessly to the control unit 138. For example, when the control unit 138 receives the electromagnetic wave from the signal receiving unit 136, the control unit 138 calculates a power intensity of the electromagnetic wave according to a parameter of the electromagnetic wave such as a voltage amplitude.

The control unit 138 is configured to control the driving element 120 according to the parameter of the electromagnetic wave. When the control unit 138 determines that the parameter of the electromagnetic wave is higher than a threshold value, for example, when a voltage (an amplitude) of the electromagnetic wave is greater than a threshold value of a voltage (an amplitude) or when a power intensity of the electromagnetic wave is greater than a threshold value of a power, the control unit 138 controls the driving element 120 to stop driving the actuation of the saw blade 110.

Figure 3:
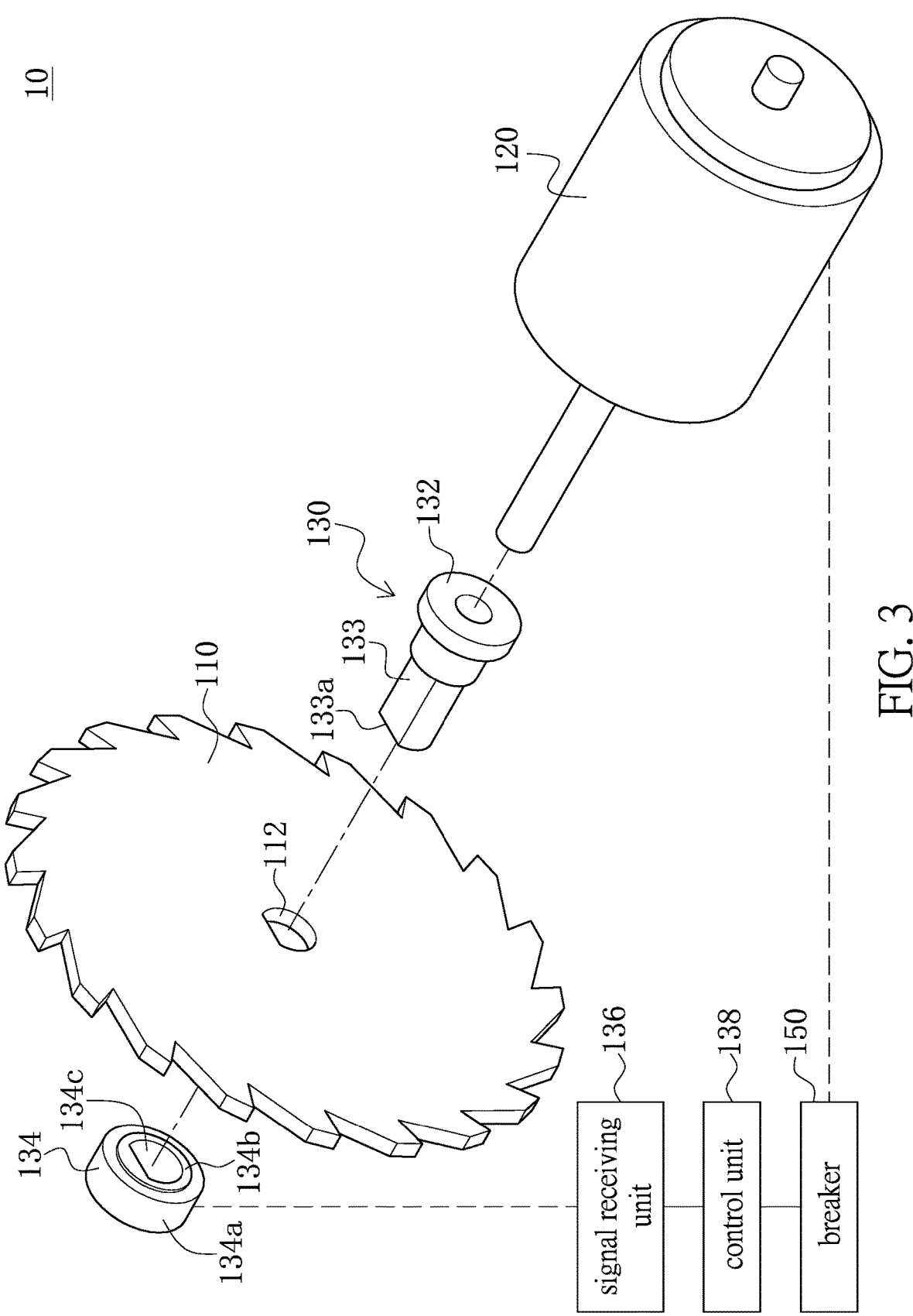
FIG. 3 is an exploded view of a machine tool according to a second embodiment of the present disclosure.
Figure 4:
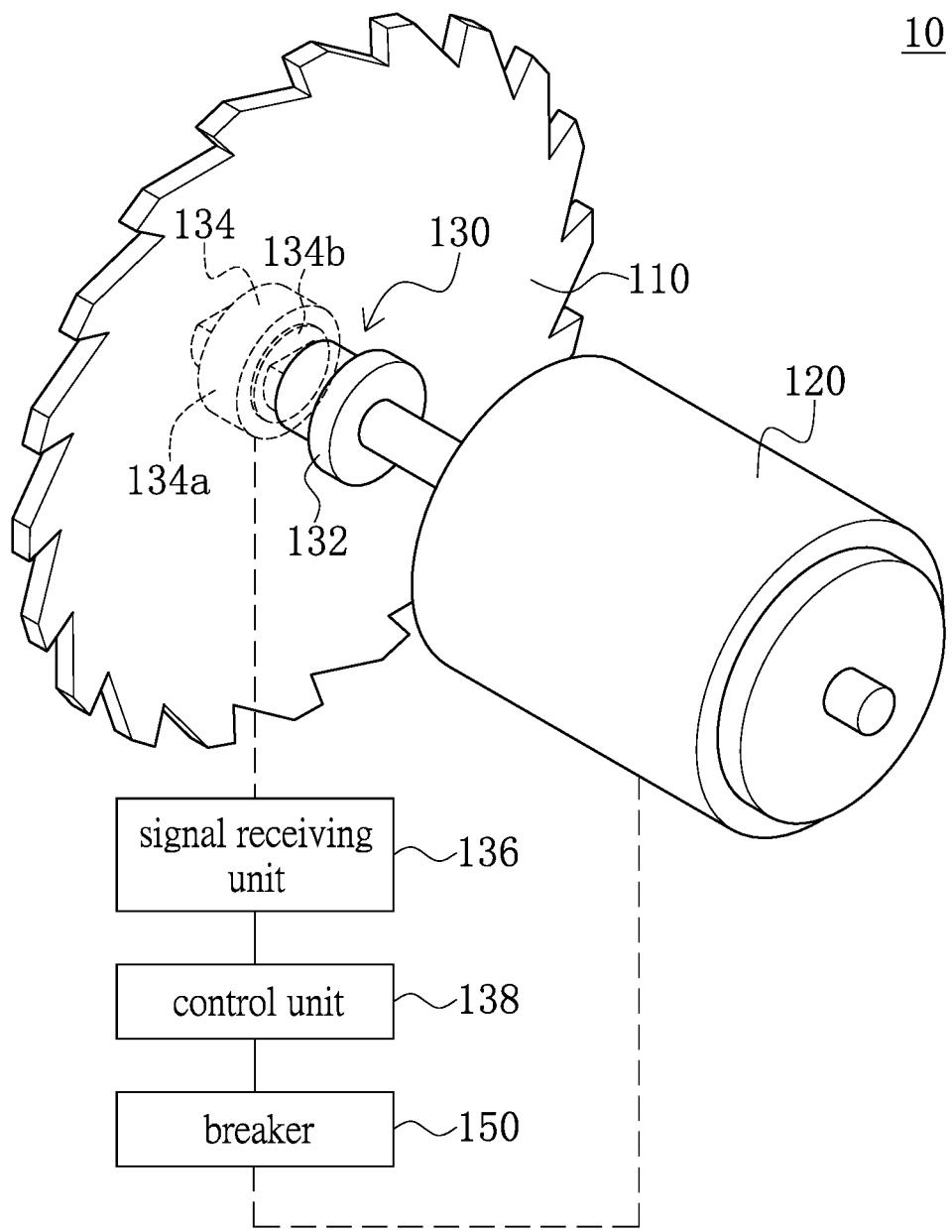
FIG. 4 is a structural view of the machine tool according to the second embodiment of the present disclosure.

References are made to FIG. 3 and FIG. 4, in which FIG. 3 illustrates an exploded view of a machine tool according to a second embodiment of the present disclosure, and FIG. 4. illustrates a structural view of the machine tool according to the embodiment of the present disclosure. In the following description, details that are the same as those described in the first embodiment will not be repeated herein.

What is different from the first embodiment is that, as shown in FIG. 3 and FIG. 4, a protective device of the second embodiment further includes a breaker 150. The breaker 150 is electrically connected between the driving element 120 (e.g. a motor) and a utility power supply. The control unit 138 can be in a wired connection (which, in practice, can be replaced with a wireless connection as shown in FIG. 1 and FIG. 2) with the receiving unit 136 and be electrically connected with the breaker 150.

The breaker 150 obtains electricity from the utility power supply, and the electricity is provided to the driving element 120 so that the driving element 120 can utilize the electricity obtained to drive the saw blade 110. The saw blade 110 is used as an antenna by the signal receiving unit 136 to receive an electromagnetic wave from an environment, such as an electromagnetic wave having the same frequency as that of a utility power. The control unit 138 is configured to receive from the signal receiving unit 136 a parameter of the electromagnetic wave, such as the voltage amplitude or a power intensity, and control the breaker 150 to be turned on and off.

For example, when the control unit 138 determines that the parameter of the electromagnetic wave is higher than a threshold value, such as when a voltage (an amplitude) of the electromagnetic wave is greater than a threshold value of a voltage (an amplitude) or when a power intensity of the electromagnetic wave is greater than a threshold value of a power, the control unit 138 controls the breaker 150 to stop the utility power supply from providing the electricity to the driving element 120. After the electricity is cut off, the driving element 120 stops driving the actuation of the saw blade 110.

Figure 5:
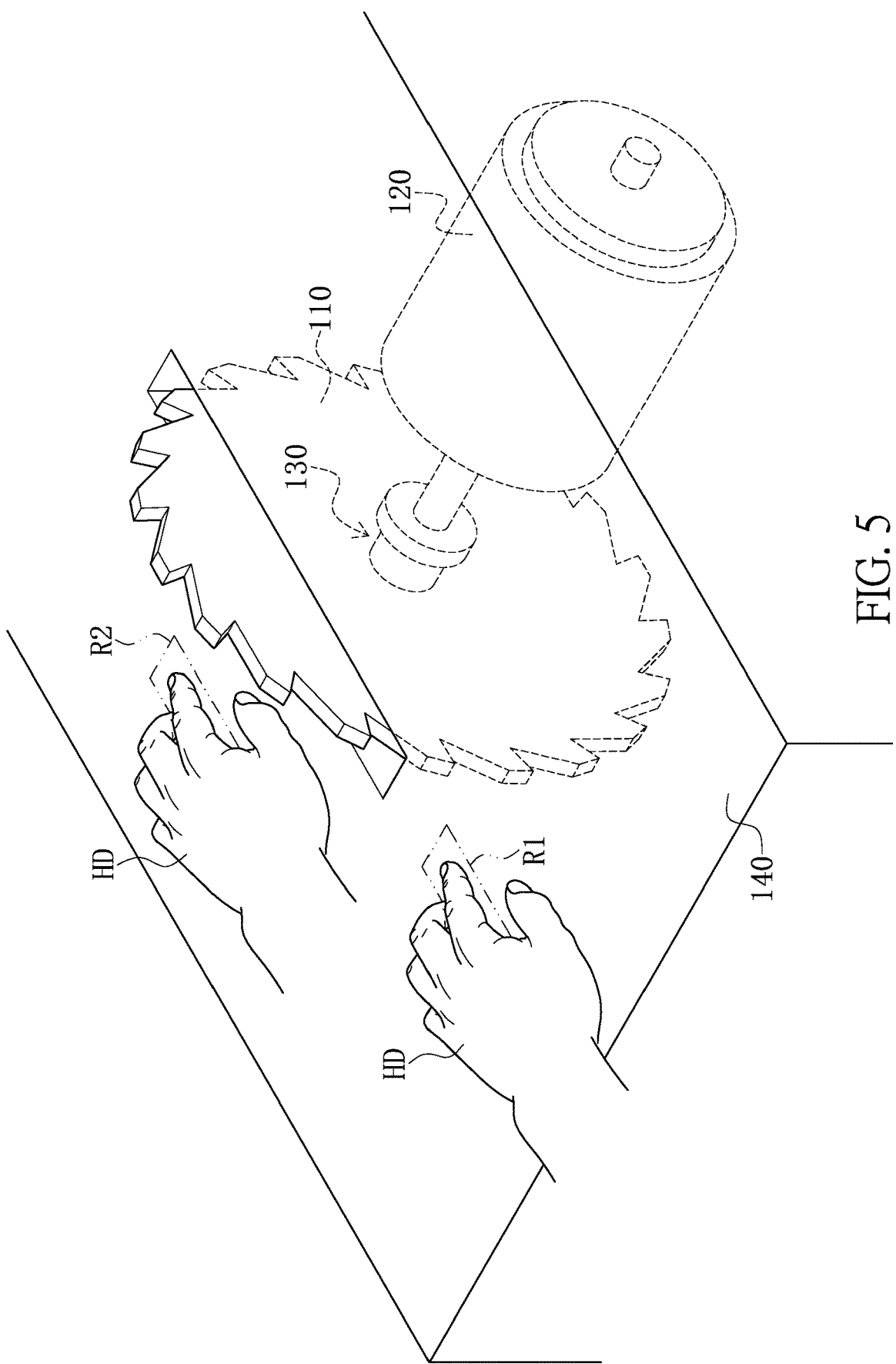
FIG. 5 is a schematic view of the machine tool setting a threshold value when in a correction mode according to one embodiment of the present disclosure.
Figure 6:
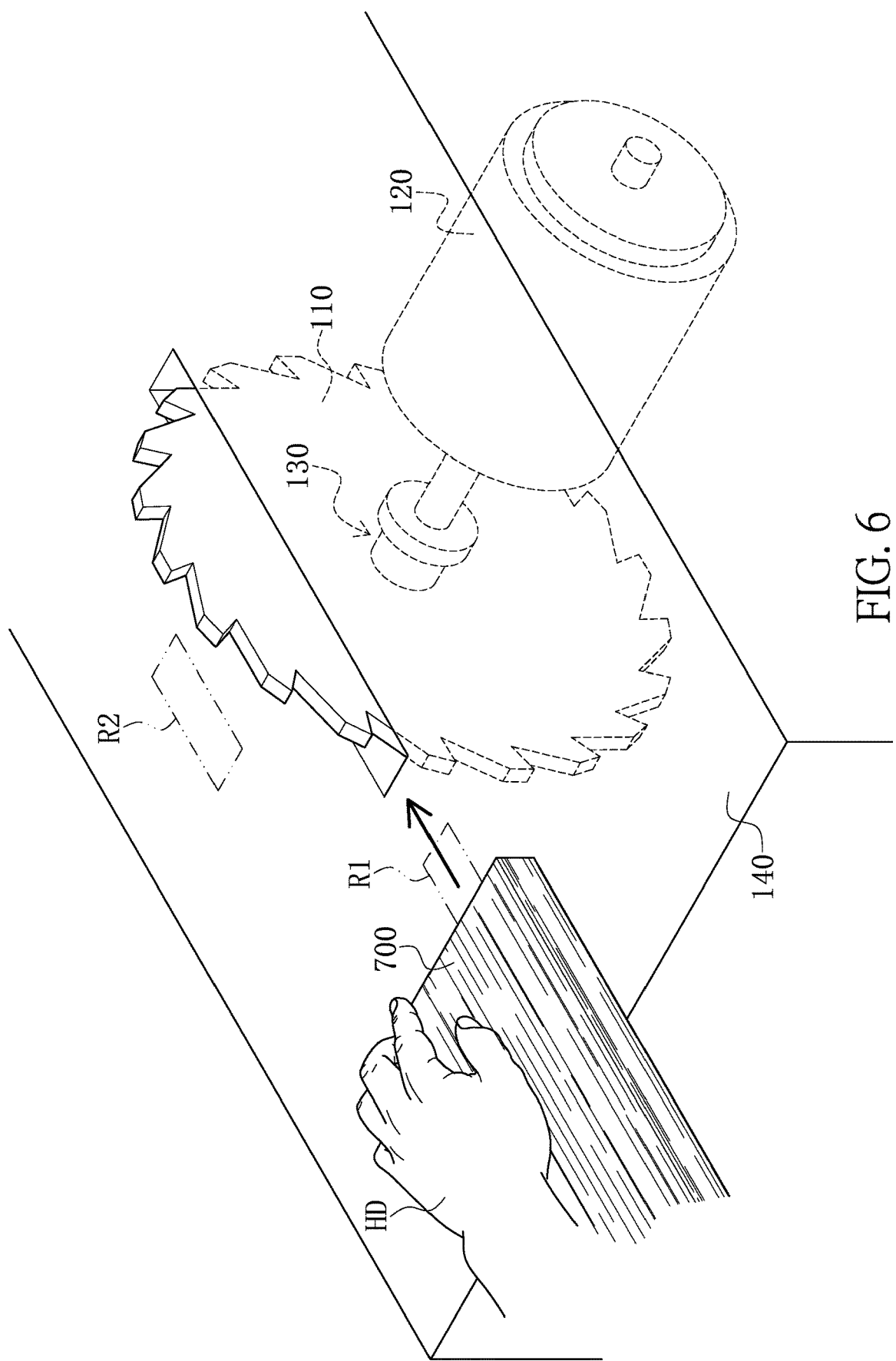
FIG. 6 is a schematic view of the machine tool being used to cut wood according to one embodiment of the present disclosure.

References are also made to FIG. 5 and FIG. 6, in which FIG. 5 is a schematic view of the machine tool setting the threshold value when in a correction mode according to one embodiment of the present disclosure, and FIG. 6 is a schematic view of the machine tool being used to cut wood according to one embodiment of the present disclosure.

As shown in FIG. 5, the saw blade 110 of the machine tool 10, the driving element 120, and the protective device (including the signal receiving unit 136, the control unit 138, and the electrically conductive member 134 as shown in FIG. 1 to FIG. 4, as well as the insulating member 130 as shown in FIG. 5) are disposed on a saw table 140.

For ease of description, in the present embodiment, a front correction area R1 and a side correction area R2 are defined on the saw table 140, but the front correction area R1 and the side correction area R2 are not limited to a countertop surface of the saw table 140. The front correction area R1 is an area located in front of the saw blade 110 of the machine tool 10, which is at a front of a front surface of the saw blade 110 used for cutting an object (such as a wood 700 as shown in FIG. 6). The front correction area R1 and the saw blade 110 are spaced apart from each other by a first lateral distance.

It should be understood that if the wood 700 is cut with a back surface of the saw blade 110, a back correction area can replace the front correction area R1 or be additionally provided. The back correction area is an area located at a back of the saw blade 110, and is opposite to the front correction area R1. Furthermore, a side correction area R2 is an area located at a side of the saw blade 110 of the machine tool 10. The side correction area R2 and the saw blade 110 are spaced apart from each other by a second lateral distance. The second horizontal distance can be the same or different from the first horizontal distance. In the present embodiment, a value for each of the first horizontal distance and the second horizontal distance is greater than zero.

In practice, the side correction area R2 can be omitted if not needed. In the present embodiment, the front correction area R1 and the side correction area R2 are merely examples for illustrative purposes. In practice, other correction areas can replace the front correction area R1 and the side correction area R2; alternatively, more correction areas can be defined. The correction areas can be labeled on the countertop surface of the saw table 140, so that a user can conveniently make a correction. Shapes and sizes of the corrections areas can be determined by any finger (e.g. a width, a length and a shape of an index finger) of a hand HD of the user as shown in FIG. 5 and FIG. 6. The above are examples for illustrative purposes only, and the present disclosure is not limited thereto.

As shown in FIG. 5, a portion of the saw blade 110 is disposed under the countertop surface of the saw table 140 and protrudes out of the countertop surface. Each protruding portion of the saw blade 110 is spaced apart from the countertop surface of the saw table 140 by a height distance. Therefore, the front correction area R1, the side correction area R2 or the other correction areas as defined are not limited to the countertop surface of the saw table 140. In practice, the correction area can be an area that is above the countertop surface of the saw table 140. That is to say, the correction area and the countertop surface of the saw table 140 are spaced apart from each other by a height distance.

In practice, before the user uses the saw blade 110 to cut the wood 700 as shown in FIG. 6, the machine tool 10 enters the correction mode. To prevent the user from accidentally touching the saw blade 110 that is operating and getting hurt in a correction process, when entering the correction mode, the driving element 120 of the machine tool 10 provided in the present embodiment stops driving operation of the saw blade 110. However, in practice, the driving element 120 can drive the saw blade 110 to operate in the correction mode if a need arises and protective measures are taken.

The control unit 138 as shown in FIG. 1 to FIG. 4 outputs a first reminder signal, so as to remind the user to place a finger of the hand HD in one correction area, for example, the front correction area R1 as shown in FIG. 5. After that, the control unit 138 outputs a second reminder signal, so as to remind the user to place the same finger or any other finger of the hand HD in another correction area, for example, the side correction area R2 as shown in FIG. 5. If more correction areas are defined, the control unit 138 can proceed to remind the user in the same or similar manner.

As shown in FIG. 5, in the correction mode, when a finger of the hand HD of the user is placed in the front correction area R1, from the electrically conductive member 134, the signal receiving unit 136 receives a first reference electromagnetic wave received from a surrounding environment by the saw blade 110 which is used as an antenna. A parameter of the first reference electromagnetic wave serves as a first reference value, such as a first reference voltage or a first reference power. The signal receiving unit 136 transmits the first reference electromagnetic wave to the control unit 138, and the control unit 138 obtains the first reference value of the first reference electromagnetic wave.

In the correction mode, when the same finger or any other finger of the hand HD of the user is placed in the side correction area R2, from the electrically conductive member 134, the signal receiving unit 136 receives a second reference electromagnetic wave received from the surrounding environment by the saw blade 110 which is used as an antenna. A parameter of the second reference electromagnetic wave serves as a second reference value, such as a second reference voltage or a second reference power. As shown in FIG. 1 to FIG. 4, the signal receiving unit 136 transmits the second reference electromagnetic wave to the control unit 138, and the control unit 138 obtains the second reference value of the second reference electromagnetic wave.

It should be noted that, since the front correction area R1 and the side correction area R2 are respectively spaced apart from the saw blade 110 by the first lateral distance and the second lateral distance, the saw blade 110 receives the first reference electromagnetic wave and the second reference electromagnetic wave when the hand HD of the user is not in contact with the saw blade 110.

In the correction mode, the control unit 138 can calculate a threshold value according to the first reference value and the second reference value received by the signal receiving unit 136 when the finger of the hand HD of the user is placed in the front correction area R1 and the side correction area R2.

Furthermore, a contact correction area is defined on the countertop surface of the saw table 140 and the saw blade 110. In the correction mode, the hand HD of the user is placed in the contact correction area. That is to say, the hand HD is in contact with the saw blade 110. At this time, from the electrically conductive member 134, the signal receiving unit 136 receives a base electromagnetic wave received from a surrounding environment by the saw blade 110 which is used as an antenna. A parameter of the base electromagnetic wave serves as a base reference value, such as a base voltage or a base power. The signal receiving unit 136 transmits the base electromagnetic wave to the control unit 138, and the control unit 138 obtains the base reference value of the base electromagnetic wave. It should be understood that, in practice, operation related with the base electromagnetic wave can be omitted.

It is worth noting that, the closer the hand HD of the user is to the saw blade 110, the greater an intensity of the electromagnetic wave received by the signal receiving unit 136 from the surrounding environment by using the saw blade 110 as an antenna. Conversely, the farther the hand HD of the user is to the saw blade 110, the weaker the intensity of the electromagnetic wave received by the signal receiving unit 136 from the surrounding environment by using the saw blade 110 as an antenna.

A purpose of the present disclosure is, when the user is using the saw blade 110 to cut an object, the hand HD of the user is prevented from coming in contact with the saw blade 110 that is operating and getting hurt. Therefore, in the present embodiment, the threshold value calculated by the control unit 138 is smaller than the base reference value, and the threshold value is greater than the first reference value and is greater than the second reference value.

After the correction is completed, as shown in FIG. 6, the driving element 120 of the machine tool 10 drives the actuation of the saw blade 110 (for example, rotating clockwise and counterclockwise) in an actual cutting mode. At this time, the user can push an object (such as the wood 700) by the hand HD toward the front surface of the saw blade 110, so as to utilize the saw blade 110 to cut the wood 700.

In the present embodiment, the threshold value calculated by the control unit 138 in the correction mode is smaller than the base electromagnetic wave received by the control unit 138 when the hand HD is in contact with the saw blade 110. Therefore, in the actual cutting mode, when the control unit 138 determines that a reference value of an actual electromagnetic wave received by the signal receiving unit 136 from the environment through antenna is greater than the threshold value, and the hand HD or any other body part of the user is too close to the saw blade 110 but does not contact the saw blade 110, the control until 138 controls the driving element 120 to stop driving the actuation of the saw blade 110, or turns off the breaker 150 so that the electricity is not provided to the driving element 120 and to thereby stop the driving element 120 and the actuation of the saw blade 110. The user can thus be prevented from coming in contact with the saw blade 110 and getting hurt thereby.

Since it may take some time for the control unit 138 to control the driving element 120 to stop driving the saw blade 110, the threshold value calculated by the control unit 138 in the correction mode is greater than the parameter of the first reference electromagnetic wave and is greater than the parameter of the second reference electromagnetic wave. Therefore, before coming in contact with the saw blade 110, when a distance between the saw blade 110 and the hand HD or the any other body part of the user is smaller than a minimal safe distance (for example, a distance between the front correction area R1 and the saw blade 110) or is smaller than a distance between the side correction area R2 and the saw blade 110, the control unit 138 stops the actuation of the saw blade 110 by controlling the driving element 120 or the breaker 150 as described above. In this way, the hand HD of the user can be more effectively prevented from being in contact with the saw blade 110 and getting hurt thereby.

Figure 7:
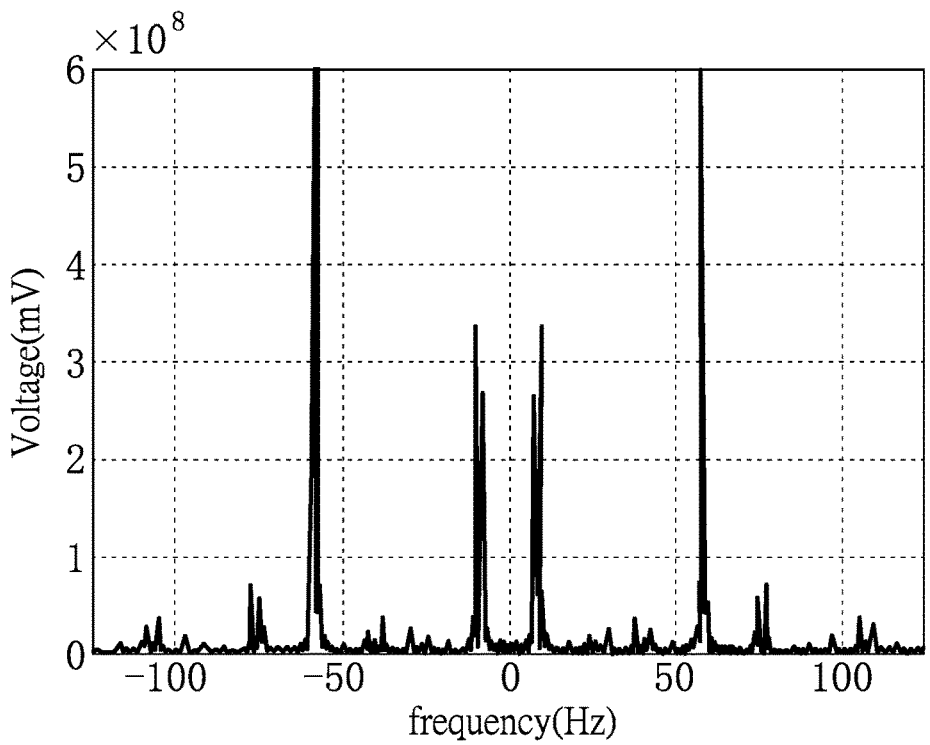
FIG. 7 shows a waveform diagram of an electromagnetic wave measured by the machine tool when a user is 1 centimeter away from a front surface of a saw blade according to one embodiment of the present disclosure.
Figure 8:
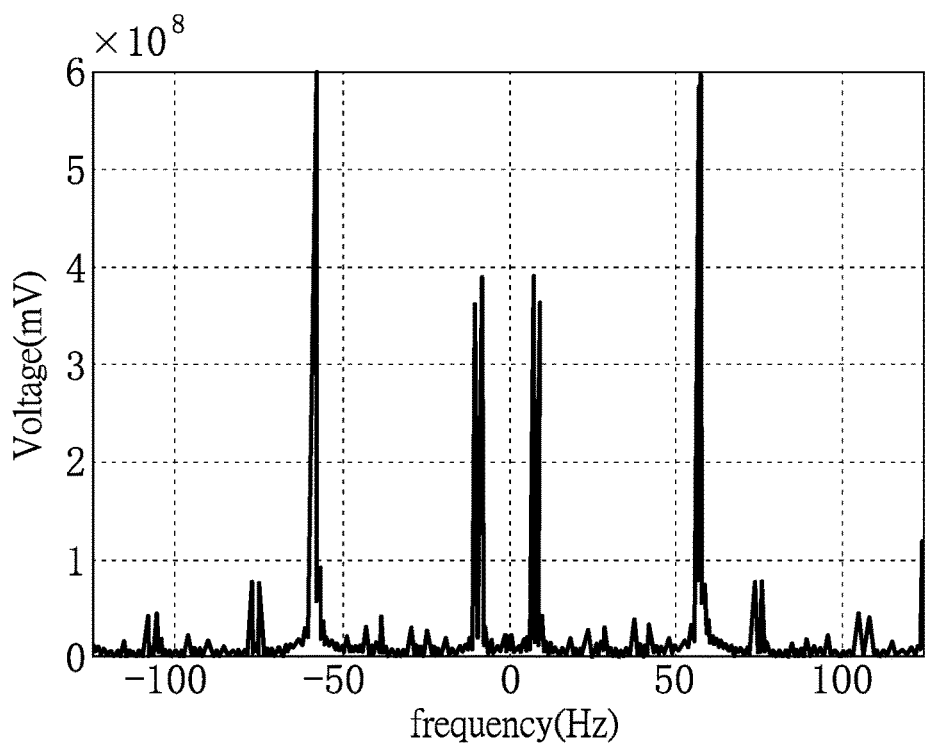
FIG. 8 shows a waveform diagram of an electromagnetic wave measured by the machine tool when the user is 0.5 centimeters away from the front surface of the saw blade according to one embodiment of the present disclosure.
Figure 9:
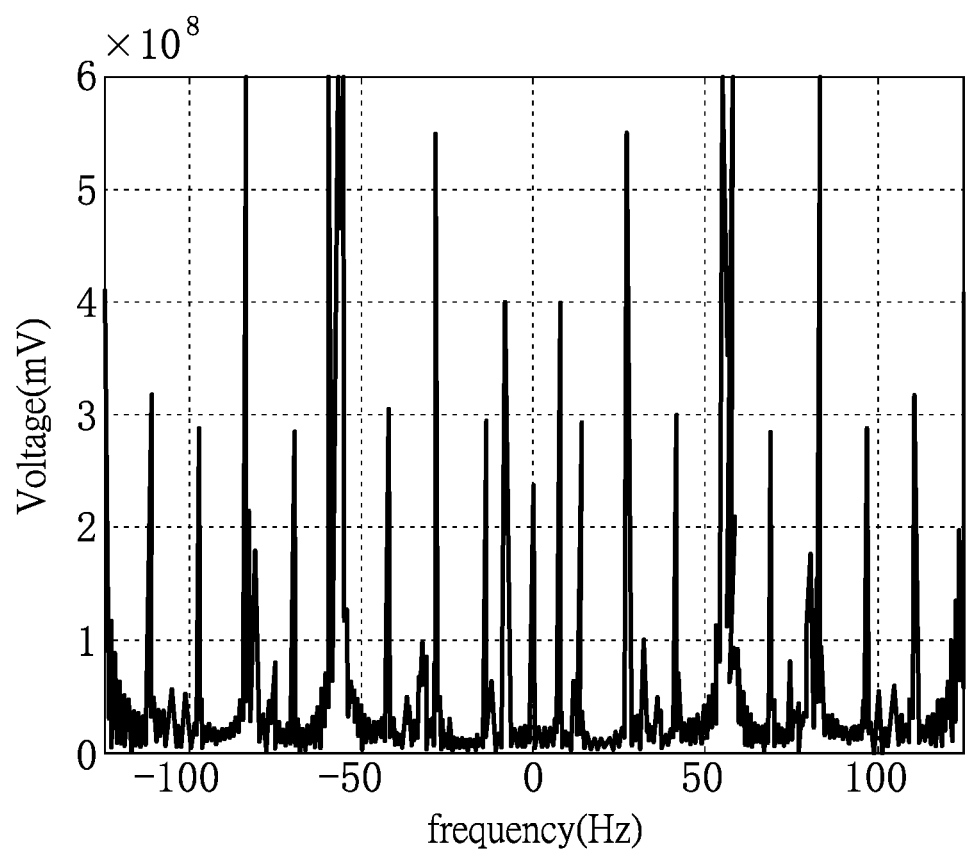
FIG. 9 shows a waveform diagram of an electromagnetic wave measured by the machine tool when the user is in contact with the front surface of the saw blade according to one embodiment of the present disclosure.

References are made to FIG. 7 to FIG. 9, in which FIG. 7 shows a waveform diagram of an electromagnetic wave measured by the machine tool when the user is 1 centimeter from the front surface of the saw blade according to one embodiment of the present disclosure, FIG. 8 shows a waveform diagram of an electromagnetic wave measured by the machine tool when the user is 0.5 centimeters from the front surface of the saw blade according to one embodiment of the present disclosure, and FIG. 9 shows a waveform diagram of an electromagnetic wave measured by the machine tool when the user is in contact with the front surface of the saw blade according to one embodiment of the present disclosure.

A vertical axis of the waveform diagram as shown in FIG. 7 to FIG. 9 denotes a magnitude of a voltage amplitude of the electromagnetic wave, which is enlarged according to a predetermined magnification so as to provide a clear illustration. Further, a horizontal axis denotes a frequency of the electromagnetic wave. As shown in FIG. 7, an intensity of the electromagnetic wave received by the saw blade which is used as an antenna when the user is 1 centimeter away from the front surface of the saw blade is weaker than an intensity of the electromagnetic wave received by the saw blade which is used as an antenna when the user is 0.5 centimeters away from the front surface of the saw blade as shown in FIG. 8. The two intensities above are both weaker than an intensity of the electromagnetic wave received by the saw blade which is used as an antenna when the user is in contact with the front surface of the saw blade as shown in FIG. 9.

Figure 10:
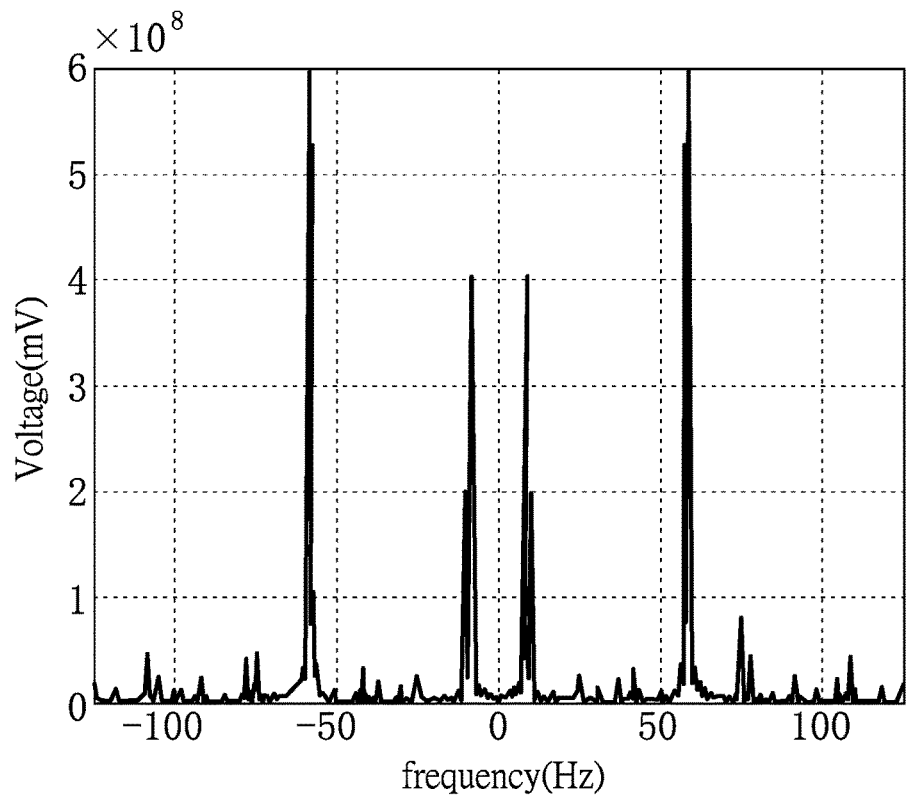
FIG. 10 shows a waveform diagram of an electromagnetic wave measured by the machine tool when the user is 1 centimeter away from a side surface of the saw blade according to one embodiment of the present disclosure.
Figure 11:
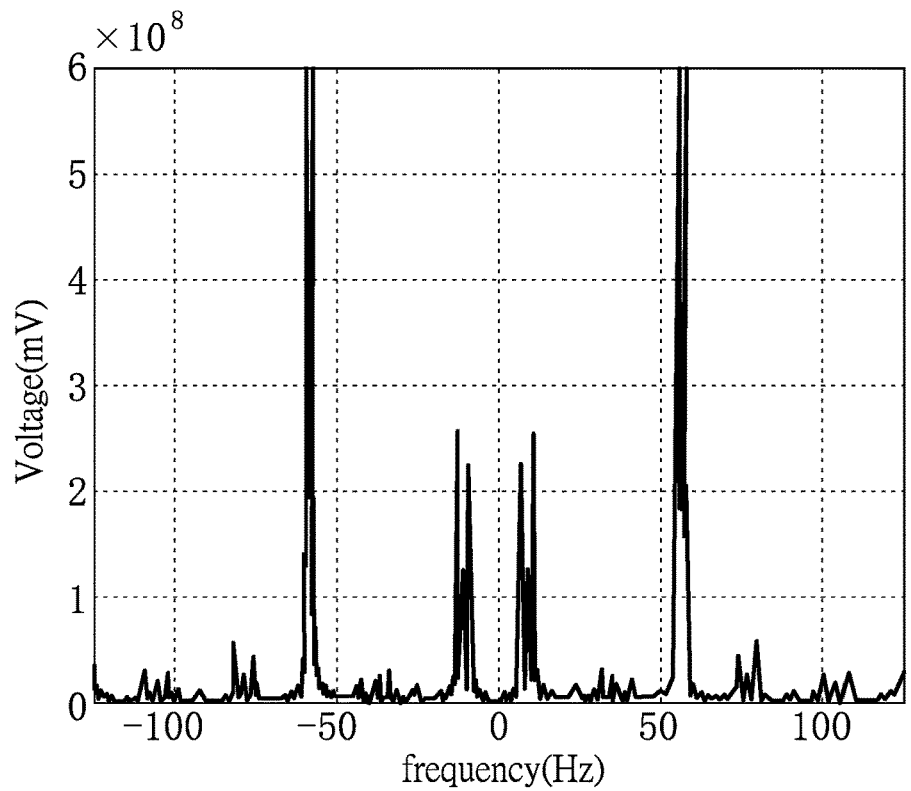
FIG. 11 shows a waveform diagram of an electromagnetic wave measured by the machine tool when the user is 0.5 centimeters away from the side surface of the saw blade according to one embodiment of the present disclosure.
Figure 12:
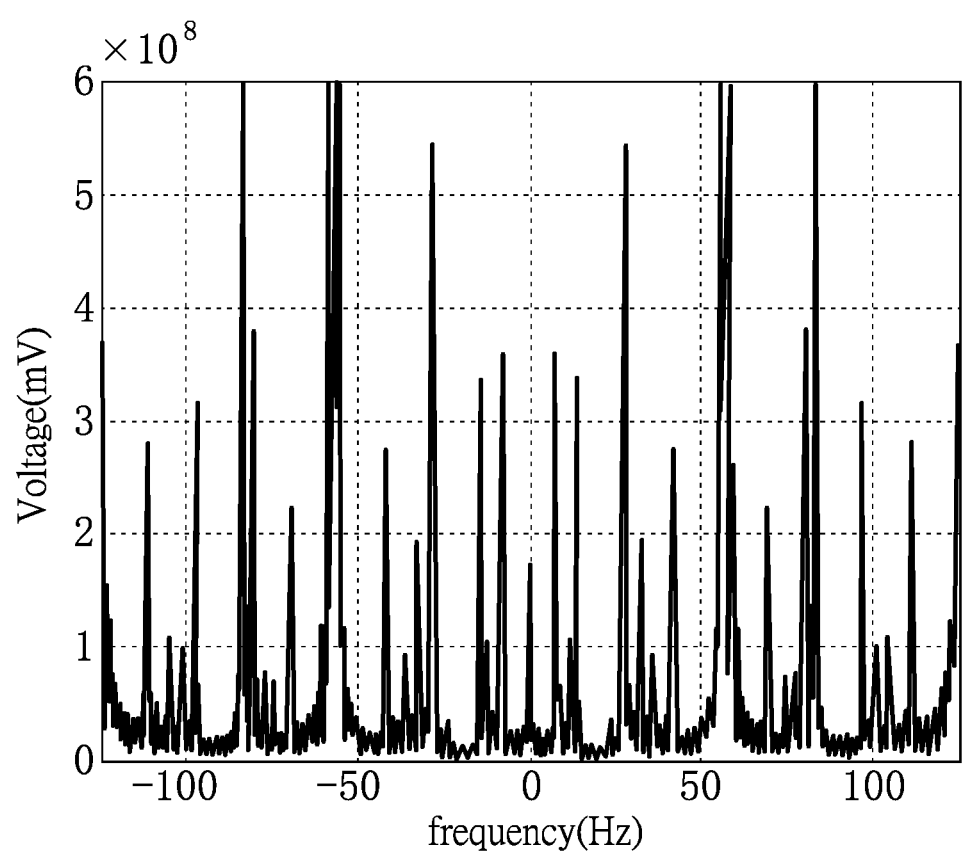
FIG. 12 shows a waveform diagram of an electromagnetic wave measured by the machine tool when the user is in contact with the side surface of the saw blade according to one embodiment of the present disclosure.

References are made to FIG. 10 to FIG. 12, in which FIG. 10 shows a waveform diagram of an electromagnetic wave measured by the machine tool when the user is 1 centimeter from a side surface of the saw blade, FIG. 11 shows a waveform diagram of an electromagnetic wave measured by the machine tool when the user is 0.5 centimeters away from the side surface of the saw blade according to one embodiment of the present disclosure, and FIG. 12 shows a waveform diagram of an electromagnetic wave measured by the machine tool when the user is in contact with the side surface of the saw blade according to one embodiment of the present disclosure.

A vertical axis of the waveform diagram as shown in FIG. 10 to FIG. 12 denotes a magnitude of a voltage amplitude of the electromagnetic wave, which is enlarged according to a predetermined magnification so as to have a clear illustration. Further, a horizontal axis denotes a frequency of the electromagnetic wave. As shown in FIG. 10, an intensity of the electromagnetic wave received by the saw blade which is used as an antenna when the user is 1 centimeter away from the side surface of the saw blade is weaker than an intensity of the electromagnetic wave received by the saw blade which is used as an antenna when the user is 0.5 centimeters away from the side surface of the saw blade as shown in FIG. 11. The two intensities above are both weaker than an intensity of the electromagnetic wave received by the saw blade which is used as an antenna when the user is in contact with the side surface of the saw blade as shown in FIG. 12.

Waveforms as shown in FIG. 7 to FIG. 9 and FIG. 10 to FIG. 12 match with the descriptions above. The closer the user is to the saw blade, the greater the intensity of the electromagnetic wave received by the signal receiving unit from the surrounding environment by using the saw blade as antenna. Conversely, the farther the hand of the user is to the saw blade, the weaker the intensity of the electromagnetic wave received by the signal receiving unit from the surrounding environment by using the saw blade as antenna.

Advantageous Effects of the Embodiments

In conclusion, one of the advantageous effects of the machine tool provided in the present disclosure is that, by virtue of "the saw blade being used as an antenna by the signal receiving unit to receive the electromagnetic wave having the same frequency as that of the utility power from the environment," and "the signal receiving unit being capable of transmitting wirelessly to the control unit to replace the wired connection method of having a common signal receiver connected to the saw blade by wires," the wires would not get tangled with the saw blade that is actuated or the electrically conductive member, etc., such that the actuation of the saw blade is not affected by the wires, and the wires may be prevented from being severed by the saw blade. At the same time, when the user is not at a safe distance from the saw blade and before the user comes in contact with the saw blade that is actuated, the actuation of the saw blade is stopped instantaneously so that the user can be effectively prevented from coming in contact with the saw blade and getting hurt.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A machine tool, comprising:
a tool including a saw blade and a driving element, the saw blade being driven by the driving element; and
a protective device including a signal receiving unit and a control unit, wherein the signal receiving unit is in electrical contact with the saw blade, and the control unit is connected to the signal receiving unit;
wherein the saw blade is used as an antenna by the signal receiving unit to receive an electromagnetic wave from an environment, and the control unit controls the driving element according to a parameter of the electromagnetic wave;
wherein when the control unit determines that the parameter of the electromagnetic wave is higher than a threshold value, the control unit controls the driving element to stop driving the saw blade;
wherein the protective device further includes a conductive member, the conductive member has a holding part and a linkage part, the linkage part is rotatable relative to the holding part, the holding part is electrically connected with the signal receiving unit, the linkage part is in direct electrical contact with the saw blade, and the signal receiving unit is in electrical contact with the saw blade through the conductive member.

2. The machine tool according to claim 1, wherein the signal receiving unit includes a wireless transmitting unit, the wireless transmitting unit being configured to wirelessly transmit the parameter of the electromagnetic wave to the control unit.

3. The machine tool according to claim 1, wherein the control unit calculates a power intensity of the electromagnetic wave according to a voltage of the electromagnetic wave, the parameter including one or both of the voltage and the power intensity.

4. The machine tool according to claim 1, wherein the conductive member includes a mercury connector being in electrical contact with the saw blade and being electrically connected with antenna receiving end of the signal receiving unit.

5. A machine tool comprising:
a tool including a saw blade and a motor, the saw blade being driven by the motor, and an insulating member being arranged between the saw blade and the motor; and
a protective device including a signal receiving unit, a control unit, and a breaker, wherein the signal receiving unit has an antenna receiving end, the antenna receiving end is in electrical contact with a middle region of the saw blade, the breaker is electrically connected between the motor and a utility power supply, and the control unit is connected to the signal receiving unit and the breaker;
wherein the saw blade is used as an antenna by the signal receiving unit to receive an electromagnetic wave having the same frequency as that of a utility power from an environment, and the control unit controls the breaker according to a change of intensity in the electromagnetic wave;
wherein when the control unit determines that a power intensity of the electromagnetic wave is higher than a threshold value, the control unit controls the breaker to stop electricity from being provided to the motor;
wherein the protective device further includes a conductive member, the conductive member has a holding part and a linkage part, the linkage part is rotatable relative to the holding part, the holding part is electrically connected with the antenna receiving end of the signal receiving unit, the linkage part is in direct electrical contact with the middle region of the saw blade, and the signal receiving unit is in electrical contact with the saw blade through the conductive member.

6. The machine tool according to claim 5, wherein the signal receiving unit includes a wireless transmitting unit, the wireless transmitting unit being configured to wirelessly transmit data information of the electromagnetic wave to the control unit.

7. The machine tool according to claim 5, wherein the control unit calculates the power intensity of the electromagnetic wave according to a voltage amplitude of the electromagnetic wave.

8. The machine tool according to claim 5, wherein the conductive member includes a mercury connector being in electrical contact with the saw blade and being electrically connected with the antenna receiving end.

* * * * *